(12) United States Patent
Coe

(10) Patent No.: US 6,433,133 B1
(45) Date of Patent: Aug. 13, 2002

(54) PROCESS FOR REDUCING THE WEIGHT AVERAGE MOLECULAR WEIGHT AND MELT INDEX RATIO OF POLYETHYLENES AND POLYETHYLENE PRODUCTS

(75) Inventor: Stephen Wayne Coe, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/698,749

(22) Filed: Oct. 27, 2000

Related U.S. Application Data

(63) Continuation-in-part of application No. 09/441,692, filed on Nov. 16, 1999, now abandoned.

(51) Int. Cl.$^7$ .............................. C08F 8/50; C08F 10/02
(52) U.S. Cl. ................... 528/481; 528/501; 528/502 C; 528/502 F; 528/503; 525/53; 525/938
(58) Field of Search ................................ 528/481, 501, 528/502 C, 502 F, 503; 525/938, 53

(56) References Cited

U.S. PATENT DOCUMENTS

| | | |
|---|---|---|
| 2,935,502 A | 5/1960 | Reding |
| 3,087,922 A | 4/1963 | Whittington |
| 3,121,070 A | 2/1964 | Coover, Jr. et al. |
| 3,144,436 A | 8/1964 | Greene et al. |
| 3,230,288 A | 1/1966 | Henderson |
| 3,243,405 A | 3/1966 | Boyer et al. |
| 3,248,469 A | 4/1966 | Kosinsky et al. |
| 3,299,181 A | 1/1967 | Coover, Jr. et al. |
| 3,332,926 A | 7/1967 | Baron, Jr. et al. |
| 3,345,352 A | 10/1967 | Baron, Jr. et al. |
| 3,412,080 A | 11/1968 | Smith et al. |
| 3,519,609 A | 7/1970 | McConnell et al. |
| 3,551,943 A | 1/1971 | Staton et al. |
| 3,562,788 A | 2/1971 | Weemes et al. |
| 3,563,972 A | 2/1971 | Kowalski |
| 3,567,691 A | 3/1971 | van Breen et al. |
| 3,598,885 A | 8/1971 | Peters |
| 3,608,001 A | 9/1971 | Kowalski et al. |
| 3,631,017 A | 12/1971 | Rettig et al. |
| 3,634,381 A | 1/1972 | Lehnerer et al. |
| 3,723,402 A | 3/1973 | Owen et al. |
| 3,803,080 A | 4/1974 | Nordsiek |
| 3,842,153 A | 10/1974 | Owen et al. |
| 3,862,265 A | 1/1975 | Steinkamp et al. |
| 3,898,209 A | 8/1975 | Watson et al. |
| 3,940,379 A | 2/1976 | Castagna et al. |
| 3,953,655 A | 4/1976 | Steinkamp et al. |
| 4,001,172 A | 1/1977 | Steinkamp et al. |
| 4,632,977 A | 12/1986 | Riazi |
| 4,707,524 A | 11/1987 | Ehrig et al. |
| 4,720,540 A | 1/1988 | Maresca et al. |
| 4,749,505 A | 6/1988 | Chung et al. |
| 5,292,862 A | 3/1994 | Miura et al. |
| 5,324,816 A | 6/1994 | Khanna et al. |
| 5,391,617 A | 2/1995 | Olivier et al. |
| 5,451,630 A | 9/1995 | Olivier et al. |
| 5,451,636 A | 9/1995 | Olivier et al. |
| 5,530,073 A | 6/1996 | Schoenberg |
| 5,541,285 A  * | 7/1996 | Agarwal ...................... 528/481 |
| 5,587,434 A | 12/1996 | McCullough, Jr. et al. |
| 5,594,074 A | 1/1997 | Hwo et al. |
| 5,621,070 A | 4/1997 | Howard, Jr. |
| 5,631,346 A  * | 5/1997 | Deckers et al. ............. 528/481 |
| 5,705,565 A | 1/1998 | Hughes et al. |
| 5,739,266 A | 4/1998 | Piana |
| 6,060,584 A  * | 5/2000 | Neely et al. ................. 528/501 |

FOREIGN PATENT DOCUMENTS

| | | |
|---|---|---|
| DE | 30 03 768 A1 | 8/1981 |
| EP | 0 324 883 A1 | 7/1989 |
| GB | 946384 | 1/1964 |
| GB | 1042178 | 9/1966 |
| WO | WO 95/25758 A1 | 9/1995 |
| WO | WO 99/40126 A1 | 8/1999 |

* cited by examiner

*Primary Examiner*—David W. Wu
*Assistant Examiner*—Caixia Lu
(74) *Attorney, Agent, or Firm*—Bernard J. Graves, Jr.; Jonathan D. Wood; Lawrence A. Chaletsky

(57) ABSTRACT

There is described a process for producing ethylene homopolymers and/or interpolymers and functionalized ethylene homopolymers and/or interpolymers, having reduced melt index ratio (MIR) and reduced weight average molecular weight (Mw). Also disclosed are novel ethylene homopolymers and interpolymers and functionalized ethylene homopolymers and/or interpolymers, having melt index ratio (MIR) less than 22 and molecular weight distribution greater than 2.4. Further described are novel ethylene interpolymers and functionalized ethylene interpolymers, having a melt index ratio less than 26, a molecular weight distribution value of greater than 2.4 and a density of less than 0.95 g/cc.

21 Claims, No Drawings

PROCESS FOR REDUCING THE WEIGHT AVERAGE MOLECULAR WEIGHT AND MELT INDEX RATIO OF POLYETHYLENES AND POLYETHYLENE PRODUCTS

CROSS-REFERENCE TO RELATED APPLICATIONS

This is a continuation-in-part application of application Ser. No. 09/441,692 filed on Nov. 16, 1999 now abandoned; the entire content of which is hereby incorporated by reference.

FIELD OF THE INVENTION

This invention relates to a process for reducing the weight average molecular weight (Mw) and the melt index ratio (MIR) of ethylene homopolymers, interpolymers, and functionalized ethylene homopolymers and interpolymers. The process includes subjecting a polymer, in molten form, to specified conditions of temperature, stirring and residence time in multiple reaction zones such that the resultant polymeric product is characterized by having reduced weight average molecular weight (Mw) and reduced melt index ratio (MIR) values, as compared to the starting polymer. The invention also relates to novel ethylene homopolymers, interpolymers, and functionalized ethylene polymers and interpolymers, that are useful in many applications, such as, for example, in blown film, cast film, extrusion coating, injection molding, adhesive and sealant raw materials, and the like.

BACKGROUND OF THE INVENTION

U.S. Pat. No. 5,631,346 describes a process for degrading polyolefins in a twin-screw extruder operated a pressure of 1–100 bar, wherein the pressure is changed with a range of variation of 0.5–30 bar.

British Patent No. 1,042,178 describes narrowing the molecular weight distribution of polyolefins by degradation using high shear gradients at temperatures between the melting point and the temperature at which purely thermal degradation of the polyolefin occurs.

U.S. Pat. No. 3,087,922 describes a process for the pyrolysis of a high molecular weight polyolefin to produce a lower molecular weight polymer by passing the polymer through a pyrolysis zone in the form of a fluid stream having annular cross section, and transferring heat of pyrolysis to the polymer through both exterior and interior boundaries of the annular stream. U.S. Pat. No. 3,248,469 describes a method of visbreaking a polymer of an olefin by feeding the polymer to a shearing zone at a controlled rate, passing sheared polymer through an extrusion zone, and maintaining a positive back pressure on the polymer. U.S. Pat. No. 5,292,862 describes a continuous process for the production of low molecular weight polyolefin by feeding the polymer to an extruder for melting, metering the molten polymer at a constant rate to a tubular degradation reactor, and thermally degrading the polymer in the reactor in the presence of a higher fatty acid, a hydrochloric acid acceptor or a mixture thereof.

The following patents describe polyolefin degradation processes that utilize a catalyst. U.S. Pat. No. 3,332,926 describes a process for degrading polyolefins by mixing a crystalline polyolefin with a metal salt of a carboxylic acid and heating the resultant mixture in an atmosphere substantially free of oxygen to a temperature of 275–450° C. U.S. Pat. No. 3,345,352 describes a process for degrading polyolefins by heating the polymer to a temperature of 275–450° C. in the presence of an oxide or carbonate catalyst and in the absence of oxygen for at least five minutes. U.S. Pat. No. 3,519,609 describes a process for degrading polyolefins at temperatures of 200–400° C. in the absence of oxygen and in the presence of an organic anhydride catalyst. U.S. Pat. No. 3,562,788 describes a process for degrading polyolefins in the presence of metal coordination polymerization catalyst residue. U.S. Pat. Nos. 3,723,402 and 3,842,153 describe processes for degrading isotactic polypropylene in the presence of an organosilicon compound.

The following patents describe processes for degrading polyolefins wherein an oxygen-containing gas is utilized. U.S. Pat. Nos. 3,551,943; 3,563,972; and 3,608,001 describe degradation processes utilizing an extruder-reactor to heat mixtures of polypropylene with an oxygencontaining gas, wherein feedback means are provided to change the temperature in the extruder thereby controlling the molecular weight of the exiting polymer. U.S. Pat. No. 3,898,209 describes a process for controlled scission of polypropylene by injection, under pressure, controlled amounts of oxygen into the melt-phase of the polypropylene at specified temperatures. U.S. Pat. No. 3,940,379 describes a process for controlled oxidative degradation of propylene polymers by injecting oxygen or an oxygen-containing gas and an organic or inorganic peroxide, melting and working the resulting mixture in a high shear zone, and recovering an essentially odor-free propylene polymer having a melt flow rate higher than that of the feed polymer.

The following patents describe processes for degrading polyolefins by mixing another polymer therewith. U.S. Pat. No. 3,121,070 describes the degradation of polypropylene at temperatures of 275–450° C. in the presence of a modifying polymer. U.S. Pat. No. 3,598,885 describes a process for preparing low molecular weight polymers by mixing relatively thermally stable polyolefins with relatively-thermally unstable polymers and thermally cracking the mixture.

The following patents describe processes for degrading polyolefins wherein a free-radical initiator is utilized. U.S. Pat. No. 4,707,524 describes the degradation of polypropylene by mixing a peroxide therewith and melting the resulting mixture under thermal mechanical action. U.S. Pat. No. 4,749,505 describes a process for degrading polyolefins in the presence of a free-radical initiator, under an inert blanket of nitrogen. U.S. Pat. No. 5,594,074 describes a process wherein unreacted free-radical generators are used to produce polymer pellets that are degraded by thermal treatment. U.S. Pat. Nos. 3,862,265 and 4,001,172 describe processes for degrading polyolefins in extruders wherein free-radical initiators are injected into the reaction zone. U.S. Pat. No. 5,530,073 describes a process for the controlled degradation of polypropylene having increased peroxide efficiency. U.S. Pat. No. 5,587,434 describes a process for degrading polypropylene wherein polypropylene is mixed with a free-radical generator in increments, in an extruder. This is also described in U.S. Pat. No. 3,144,436.

SUMMARY OF THE INVENTION

The novel products of the present invention include ethylene interpolymers and functionalized ethylene interpolymers, having a melt index ratio (MIR) of less than 26, a molecular weight distribution (MWD) of greater than 2.4 and a density of less than 0.95 g/cc. Also included as novel products of the present invention are ethylene homopolymers, interpolymers, and functionalized ethylene homopolymers and interpolymers, having a melt index ratio (MIR) of less than 22 and a molecular weight distribution value of greater than 2.4.

The novel process of the present invention for the production of ethylene homopolymers, interpolymers, and functionalized ethylene homopolymers and interpolymers, having reduced weight average molecular weigth (Mw) and reduced melt index ratio (MIR), including the novel ethylene homopolymers, interpolymers, and functionalized ethylene homopolymers and interpolymers, of the present invention, is comprised as follows. An ethylene homopolymer and/or interpolymer is introduced into an apparatus in the form of a solid particulate, for example, pellets or powder, and then melted, preferably at a temperature of at least 175° C.; the molten polymer is then introduced into at least two, or more, reaction zone(s)-that are sequentially located and heated to a temperature of at least 220° C., more preferably from at least 280° C. to about 600° C.; when utilized, a functionalizing agent may be introduced into the melting zone or at least one, or more of the reaction zones, or any combinations thereof; subjecting the molten polymer, in the heated zones, to sufficient stirring and residence time such that the molecular weight (Mw) and the melt index ratio (MIR) of the polymer are reduced; and recovering the resultant polymeric product having the reduced molecular weight (Mw) and reduced melt index ratio (MIR). The conditions in each of the reaction zones, into which molten polymer is introduced, may be the same or different. In a preferred embodiment of the process, the apparatus is vented, preferably by means of vacuum venting, subsequent to formation of the desired polymeric product and prior to recovering the polymeric product.

DETAILED DESCRIPTION OF THE INVENTION

The applicant has unexpectedly discovered a novel process for producing ethylene homopolymers, interpolymers, and functionalized ethylene homopolymers and interpolymers, having reduced weight average molecular weight (Mw) and reduced melt index ratio (MIR), as compared to the starting polymeric material. The process may be used to prepare a wide variety of ethylene homopolymers and/or interpolymers and/or functionalized ethylene homopolymers and interpolymers, having reduced weight average molecular weight (Mw) and melt index ratio (MIR) values, including the novel ethylene homopolymers, interpolymers, and functionalized ethylene homopolymers and interpolymers of the present invention.

The novel ethylene homopolymers, interpolymers, and functionalized ethylene homopolymers and interpolymers, of the present invention include the following products.

A first type of novel product includes ethylene interpolymers, and functionalized ethylene interpolymers, characterized by having a melt index ratio (MIR) value of less than 26, a molecular weight distribution value (Mw/Mn) of greater than 2.4 and a density of less than 0.95 g/cc. The novel ethylene interpolymers, and functionalized ethylene interpolymers, of the present invention are preferably characterized by having a melt index ratio of from 1 to less than 26, a molecular weight distribution of from greater than 2.4 to about 30, and a density of from greater than 0.87 to less than 0.95 g/cc.

Another type of novel product includes ethylene homopolymers, interpolymers, and functionalized ethylene homopolymers and interpolymers, characterized by having a melt index ratio value of less than 22 and a molecular weight distribution value of greater than 2.4. The novel ethylene homopolymers, interpolymers, and functionalized ethylene homopolymers and interpolymers, are preferably characterized by having a melt index ratio value of from 1 to less than 22 and a molecular weight distribution value of from greater than 2.4 to about 30.

Furthermore, with respect to the above described types of novel polymers, the ethylene interpolymers and functionalized ethylene interpolymers are characterized as interpolymers of ethylene with at least one or more other olefin monomer having from 3 to 16 carbon atoms, containing at least 50% by weight of ethylene.

The novel polymeric products are useful in many applications including, for example, blown film, cast film, extrusion coating, injection molding, and the like.

The novel process of the present invention for producing ethylene homopolymers, interpolymers, and functionalized ethylene homopolymers and interpolymers, having reduced melt index ratio and reduced weight average molecular weight (Mw) values comprises:

a. introducing ethylene homopolymer and/or interpolymer in solid particulate form (for example, powder or pellets). into an apparatus and melting the ethylene homopolymer and/or interpolymer at a temperature above the melting point of the polymer, preferably at a temperature of at least 175° C.

b. introducing the molten polymeric product into at least two, or more, reaction zones that are sequentially located and are each maintained at a temperature of at least 220° C., preferably at a temperature of from about 280° C. to about 600° C., c. when utilized, a functionalizing agent may be introduced into the melting zone or at least one, or more, of the reaction zones, or any combination thereof;

d. subjecting the molten polymeric product, in each of the heated zones, to sufficient stirring and residence time such that the weight average molecular weight.(Mw) and the melt index ratio (MIR) values of the polymeric product are reduced, and e. recovering the resultant ethylene homopolymer or interpolymer having reduced weight average molecular weight (Mw) and reduced melt index ratio (MIR).

Where it is desired to produce a functionalized ethylene homopolymer and/or interpolymer, a functionalizing agent is introduced into the melting zone or any of the reaction zones, or any combination of melting zone and reaction zones.

In the process of the present invention, the molten polymeric product, in each of the heated zones, is stirred preferably at a rate of from at least about 100 revolutions per minute (rpm), preferably from about 100 to about 1500 rpm, and more preferably at a rate of from about 300 to about 500 revolutions per minute (rpm), for a period of time of at least about 5 seconds, preferably for at least about 5 to 300 seconds, and, more preferably, for a period of time of at least from about 30 to about 120 seconds.

Furthermore, the interpolymers of ethylene that are suitable for use in the process of the present invention are interpolymers of ethylene with at least one other monomer that is interpolymerizable with the ethylene, wherein the ethylene is present in an amount of at least about 50 weight percent. Mixtures of interpolymers of ethylene can be utilized herein. The at least one other monomer may be an olefin having from 3 to 16 carbon atoms. Exemplary olefins that may be utilized herein are propylene, 1-butene, 1-pentene, 1-hexene, 1-heptene, 1-octene, 4-methylpent-1-end, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinyldene-2-norbornene, 5-vinyl-2-norbornene, 1,7 octadiene.

Exemplary of other monomers that are interpolymerizable with ethylene and are suitable for use herein, include alkyl acrylates, where the alkyl group has from about 1 to about 15 carbon atoms, such as methyl acrylate, n-butyl acrylate, n-propyl acrylate, 2-ethylhexyl acrylate, ethyl acrylate, and the like; alkyl methacrylates wherein the alkyl group has from about 1 to about 15 carbon atoms, such as methyl methacrylate, n-butyl methacrylate, n-propyl methacrylate, n-pehtyl methacrylate, 2-ethylhexyl methacrylate, ethyl methacrylate, and the like; ethylenically unsaturated carboxylic acids such as acrylic acid, crotonic acid, methacrylic acid, and the like; ethylenically unsaturated dicarboxylic acids or anhydrides thereof, such as itaconic acid, maleic acid, fumaric acid, maleic anhydride, and the like; vinyl carboxylates where the carboxylates have from about 1 to about 15 carbon atoms, such as vinyl acetate, vinyl propionate, and the like; mixtures of monomers interpolymerizable with ethylene may also be utilized to provide ethylene interpolymers suitable for use herein.

The functionalizing agent utilized in the present invention may be any unsaturated monomer containing one or more carboxylic acid or acid anhydride groups. Examples of suitable functionalizing agents herein are carboxylic acids such as acrylic and methacrylic acid, and acid anhydrides such as maleic anhydride. Further exemplary functionalizing agents suitable for use herein are unsaturated monocarboxylic acids and polycarboxylic acids and cyclic acid anhydrides. Specifically included herein are acids such as maleic acid, fumaric acid, himic acid, itaconic acid, citraconic acid, mesaconic acid, acrylic acid, methacrylic acid, crotonic acid, isocrotonic acid, and acid anhydrides such as maleic anhydride and himic anhydride. Preferred for use herein as the functionalizing agent is maleic anhydride. Mixtures of functionalizing agents may be utilized in the present invention. The functionalizing agent is utilized in any amount that will functionalize the ethylene homopolymer and/or interpolymer. Preferably, the functionalizing agent will be utilized in an amount of from about 0.20 to about 10 weight percent, based on the weight of the ethylene component; more preferably in an amount of about 0.50 to about 8 weight percent, and still more preferably in an amount of about 0.50 to about 4 weight percent.

In a preferred embodiment of the process of the present invention, venting of the process is carried out after the desired polymeric product having the reduced molecular weight and reduced melt index ratio has been produced, and prior to recovering the desired polymeric product. It is preferred that the venting be vacuum venting at a pressure less than atmospheric pressure. Venting is performed for the discharge of volatile materials.

The process according to the present invention is conducted in a continuous or batch process. Any continuous process can be used in the practice of the present invention. However, multi-screw extruders are generally more preferred, with a twin-screw extruder being most preferred. In general, the twin-screw extruder has two shafts that are preferably intermeshing, and that may be either co-rotating or counter-rotating. As used herein, the term, intermeshing, describes shafts that fit together such that the shafts rotate in coordination with each other in close proximity without mechanical interference. Further, as used herein, the term, corotating, describes shafts rotating in the same direction; the term, counterrotating, describes shafts rotating in opposite directions.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. Moreover, all U.S. patents referred to herein are incorporated by reference in their entirety.

EXAMPLES

In the following examples, the test procedures listed below were used in evaluating the analytical properties of the ethylene homopolymers and interpolymers herein.

a) Density is determined in accordance with ASTM D2839-93 except for the following:
  a) The conditioning procedure as described in 7.2 and 7.3 was omitted;
  b) The strand was conditioned for 30 minutes at 23° C.;
  c) The density was determined in accordance with ASTM D1505 immediately following 7.4;
  d) The density was determined by averaging the density values of at least three test specimens. The maximum difference allowed between the lowest density test specimen and the highest density test specimen was 0.0005 g/cm$^3$. If this difference was >0.0005 g/cm$^3$, then the test was repeated starting with 7.1.

b) Melt Index (MI), $I_2$, is determined in accord with ASTM D-1238, condition E, measured at 190° C., and reported as decigrams per minute;

c) High Load Melt Index (HLMI) $I_{21}$, is measured in accord with ASTM D-1238, Condition F, measured at 10.0 times the weight used in the melt index test above;

d) Melt Index Ratio (MIR)=$I_{21}/I_2$ or High Load Melt Index/Melt Index;

e) The Weight Average (Mw) and Number Average (Mn) molecular weights were determined using a Waters Gel Permeation Chromatography Series 150C/ALC/GPC @ 138° C. The method for determining Mw and Mn is that recommended by Millipore Corporation, Milford, Mass., in the operators manual 082916TP Revision O, October 1993. The Gel Permeation Chromatography unit (GPC) was equipped with ultra styrogel columns and a refractive index detector. The instrument automatically calculates the Mw (Weight Average Molecular Weight) and Mn (Number Average Molecular Weight) using standard TriSEC GPC software version 2.70 as sold with the machine. The machine was calibrated with NBS 1475 polyethylene acquired from the U.S. Department of Commerce National Institute of Standards and Technology in Gathersburg, Md. 20899. The solvent used was ortho-dichlorobenzene. The polyethylene was dissolved in the ortho-dichlorobenzene such that a solution containing 0.1 percent polyethylene was formed. The solution was run through the GPC at 1.0 milliliter/minute.

f) The molecular weight distribution (MWD) is the ratio of Mw/Mn.

The apparatus utilized in Examples 1–5 and 8, for carrying out the process was a Berstorff ZE40A×55 L/D (length/diameter) co-rotating twin-screw extruder. The Berstorff twin-screw extruders are produced and sold by Berstorff Corporation, of Florence, Ky.

Example 1

Pellets of CM-27050-F LLDPE (linear low density polyethylene) produced and sold by Eastman Chemical Company, Kingsport, Tenn., were fed, with a volumetric pellet feeder, into the inlet hopper of the extruder at a rate of 57 lb/hr (pounds per hour) (25.86 kilograms/hour, kg/hr). The LLDPE polymer comprises ethylene and hexene, and is characterized by having a melt index (MI) value of 0.445 dg/min, a melt index ratio of 32, a density of 0.9075 g/cc, a weight average molecular weight (Mw) of 177,000, a number average molecular weight (Mn) of 35,600 and a molecular weight distribution (Mw/Mn) of 4.97. The extruder was operated at a rate of 300 revolutions per minute (rpm). The LLDPE polymer was fed to the extruder and melted. The molten LLDPE polymer was thereafter introduced into three reaction zones that were sequentially located (each zone following a prior zone, with the first zone following the location where the polymer was melted). Each of the reaction zones of extruder was maintained at a temperature of 250° C. and the molten LLDPE polymer remained in each zone for a residence time of at least 5 seconds, such that the weight average molecular weight (Mw) and the melt index ratio (MIR) of the LLDPE polymer were reduced. Two zones of vacuum ventin at a temperature of 250° C. were used to remove volatiles, the first vacuum zone was at 28 inches of mercury (94.59 KPa, kilopascals) and the second vacuum zone was also at 28 inches of mercury (94.59 kilopascals). The resultant LLDPE was recovered by extruding the molten product into a standard cold water stranding bath. The cooled strands were subsequently chopped into pellets. The resultant LLDPE product was analyzed and found to have the following properties:

Melt Index (MI) of 1.47 dg/min
Melt Index Ratio (MIR) of 26.7
Density of 0.9084 g/cc
Weight Average Molecular Weight (Mw) of 133,000
Number Average Molecular Weight (Mn) of 38,600
Molecular Weight Distribution (Mw/Mn) of 3.46

Example 2

The procedure of Example 1 was followed except for the following:
a) The three reaction zones were maintained at a temperature of 340° C.;
b) Feedstock was introduced at a rate of 89 lb/hr (40.37 kg/hr); the resultant LLDPE product was analyzed and found to have the following properties:
Melt Index (MI) of 7.1 dg/min
Melt Index Ratio (MIR) of 22.8
Density of 0.9088 g/cc
Weight Average Molecular Weight (Mw) of 85,000
Number Average Molecular Weight (Mn) of 28,100
Molecular Weight Distribution (Mw/Mn) of 3.04

Example 3

The procedure of Example 1 was followed except for the following:
a) The feedstock utilized was Eastman Chemical Company LT-24016-F LLDPE, ethylene hexene copolymer characterized by having a melt index of 0.6 dg/min, a melt index ratio of 29.3, a density of 0.917 g/cc, Mw of 142,200, Mn of 35,300 and Mw/Mn of 4;
b) The extruder was operated at a rate of 150 rpm;
c) The three reaction zones were maintained at a temperature of 415° C.;
d) The feedstock was introduced at a rate of 98 lb/hr (44.45 kg/hr); and e) The first zone of vacuum was at 28 inches of mercury (94.59 KPa), and the second zone of vacuum was at 27 inches of mercury (91.2 KPa).
The resultant LLDPE polymer was analyzed and found to have the following properties:
Melt Index (Ml) of 72 dg/min
Melt Index Ratio (MIR) of 11.4
Density of 0.9142 g/cc
Weight Average Molecular Weight (Mw) of 45,900
Number Average Molecular Weight (Mn) of 18,600
Molecular Weight Distribution (Mw/Mn) of 2.47

Example 4

The procedure of Example 1 was followed except for the following:
a) The feedstock utilized was a blend of 75 weight percent Eastman Chemical Company CM-27050F LLDPE (defined in Example 1) and 25 weight percent Eastman Chemical Company H-6001A high density polyethylene (HDPE) characterized by having a melt index of 8, a melt index ratio of 28, density of 0.962 g/cc, Mw of 72,000, Mn of 21,000 and Mw/Mn of 3.4;
b) The extruder was operated at a rate of 380 rpm;
c) The three reaction zones were maintained at a temperature of 415° C.;
d) The feedstock was introduced at a rate of 47 lb/hr (21.3 kg/hr); and
e) The first zone of vacuum was at 27.5 inches of mercury (92.9 KPa), and the second zone of vacuum was at 27 inches of mercury (91.2 KPa). The resultant polymer was analyzed and found to have the following properties:
Melt Index (MI) of 220 dg/min
Melt Index Ratio (MIR) of 18.9
Density of 0.9264 g/cc
Weight Average Molecular Weight (Mw) of 34,300
Number Average Molecular Weight (Mn) of 13,800
Molecular Weight Distribution (Mw/Mn) of 2.49

Example 5

The procedure of Example 1 was followed with the following exceptions. The feedstock utilized was Eastman. Chemical Company CV-77502 LLDPE ethylene hexene copolymer characterized by having a melt index of 0.5 dg/min, a melt index ratio of 31.5, a density of a 0.906 g/cc, a Mw of 165,000, a Mn of 43,000 and a Mw/Mn of 3.7. The LLDPE polymer was introduced at a rate of 57 lb/hr (25.86 kg/hr). The extruder was operated at a rate of 300 rpm. The LLDPE polymer was fed to the extruder and melted. The molten polymer was introduced thereafter into two reaction zones, sequentially located, of the extruder that were maintained at a temperature of 300° C. and in each of which zones the molten LLDPE polymer remained for a residence time of at least 5 seconds, such that the weight average molecular weight (Mw) and the melt index ratio (MIR) of the LLDPE polymer were reduced. The two zones of vacuum venting, at a temperature of 250° C. were used, the first zone was at 27 inches of mercury (91.2 KPa) and the second zone was at 27 inches of mercury (91.2 KPa). The resultant LLDPE product was found to have the following properties:
Melt Index (MI) of 4.2 dg/min
Melt Index Ratio (MIR) of 22.5
Density of 0.910 g/cc
Weight Average Molecular Weight (Mw) of 45,700

Number Average Molecular Weight (Mn) of 21,600

Molecular Weight Distribution (Mw/Mn) of 2.1

The apparatus utilized in Examples 6 and 7 for carrying out the process was a Berstorff ZE25X63 L/D (length/diameter) co-rotating twin-screw extruder. The extruder is produced and sold by Berstorff Corporation.

Example 6

Pellets of H6001A HDPE (high density polyethylene) produced and sold by Eastman Chemical Company, Kingsport, Tenn., were fed, with a volumetric pellet feeder, into the inlet hopper of the extruder at a rate of 29.1 lb/hr (pounds per hour) (13.2 kg/hr). The HDPE polymer is characterized by having a melt index (MI) value of 7.3 dg/min, a melt index ratio (MIR) of 26.4, a weight average molecular weight (Mw) of 87,800, a number average molecular weight (Mn) of 10,000 and a molecular weight distribution (Mw/Mn) of 8.78. The extruder was operated at a rate of 425 revolutions per minute (rpm). The HDPE polymer was fed to the extruder and melted. The molten HDPE polymer was thereafter introduced into three reaction zones that were sequentially located (each zone following a prior zone, with the first zone following the location where the polymer was melted). Each of the reaction zones of extruder was maintained at a temperature of 400° C. and the molten HDPE polymer remained in each zone for a residence time of at least 5 seconds, such that the weight average molecular weight (Mw) and the melt index ratio (MIR) of the HDPE polymer were reduced. Molten maleic anhydride was introduced into the second of the three reaction zones at a rate of 0.17 pound/hr (0.08 kg/hr), and mixed, Two zones of vacuum venting at a temperature of 215° C. were used to remove volatiles, the first vacuum zone was at 26 inches of mercury (87.8 KPa) and the second vacuum zone was also at 26 inches of mercury (87.8 kpa). The resultant HDPE was recovered by extruding the molten product into a standard cold water stranding bath. The cooled strands were subsequently chopped into pellets. The resultant HDPE product was analyzed and found to have the following properties:

Melt Index (MI) of 37 dg/min

Melt Index Ratio (MIR) of 21

Weight Average Molecular Weight (Mw) of 38,800

Number Average Molecular Weight (Mn) of 8520

Molecular Weight Distribution (Mw/Mn) of 4.55

Example 7

Pellets of CV-27052-F LLDPE (linear low density polyethylene) produced and sold by Eastman Chemical Company, Kingsport, Tenn., were fed, with a volumetric pellet feeder, into the inlet hopper of the extruder at a rate of 17 lb/hr (pounds per hour) (7.71 kg/hr). The LLDPE polymer comprises ethylene and hexene, and is characterized by having a melt index (MI) value of 0.52 dg/min, a melt index ratio of 29.3, a weight average molecular weight (Mw) of 124,800, a number average molecular weight (Mn) of 24,200 and a molecular weight distribution (Mw/Mn) of 5.16. The extruder was operated at a rate of 450 revolutions per minute (rpm). The LLDPE polymer was fed to the extruder and melted. The molten LLDPE polymer was thereafter introduced into three reaction zones that were sequentially located (each zone following a prior zone, with the first zone following the location where the polymer was melted). Each of the reaction zones of extruder was maintained at a temperature of 350° C. and the molten LLDPE polymer remained in each zone for a residence time of at least 5 seconds, such that the weight average molecular weight (Mw) and the melt index ratio (MIR) of the LLDPE polymer were reduced. Molten maleic anhydride was introduced into the second of the three reaction zones at a rate of 0.13 pounds/hr (0.06 kg/hr) and mixed. Two zones of vacuum venting at a temperature of 215° C. were used to remove volatiles, the first vacuum zone was at 27 inches of mercury (91.2 KPa) and the second vacuum zone was also at 27 inches of mercury (91.2 KPa). The resultant LLDPE was recovered by extruding the molten product into a standard cold water stranding bath. The cooled strands were subsequently chopped into pellets. The resultant LLDPE product was analyzed and found to have the following properties:

Melt Index (MI) of 21.5 dg/min

Melt Index Ratio (MIR) of 19.9

Weight Average Molecular Weight (Mw) of 45,400

Number Average Molecular Weight (Mn) of 16,200

Molecular Weight Distribution (Mw/Mn) of 2.80

Example 8

Pellets of EMAC SP2268 ethylene methyl acrylate copolymer (EMAC) produced and sold by Eastman Chemical Company, Kingsport, Tenn., were fed, with a volumetric pellet feeder, into the inlet hopper of the extruder at a rate of 160 lb/hr (pounds per hour) (72.6 kg/hr). The EMAC polymer comprises ethylene and methyl acrylate, and is characterized by having a melt index (MI) value of 9 dg/min, a melt index ratio of 38, a weight average molecular weight (MW) of 75,400, a number average molecular weight (Mn) of 17,900 and a molecular weigh t distribution (Mw/Mn) of 4.21. The extruder was operated at a rate of 330 revolutions per minute (rpm). The EMAC polymer was fed to the extruder and melted. The molten EMAC polymer was thereafter introduced into three reaction zones that were sequentially located (each zone following a prior zone, with the first zone following the location where the polymer was melted). Each of the reaction zones of extruder was maintained at a temperature of 350° C. and the molten EMAC polymer remained in each zone for a residence time of at least 5 seconds, such that the weight average molecular weight (Mw) and the melt index ratio (MIR) of the EMAC polymer were reduced. Two zones of vacuum venting at a temperature of 250° C. were used to remove volatiles, the first vacuum zone was at 28 inches of mercury (94.59 KPa) and the second vacuum zone was also at 28 inches of mercury (94.59 KPa). The resultant EMAC was recovered by extruding the molten product into a standard cold water stranding bath. The cooled strands were subsequently chopped into pellets. The resultant LLDPE product was analyzed and found to have the following properties:

Melt Index (MI) of 22.7 dg/min

Melt Index Ratio (MIR) of 32.3

Weight Average Molecular Weight (Mw) of 63,300

It should be clearly understood that the forms of the invention herein described are illustrative only and are not intended to limit the scope of the invention. The present invention includes all modifications falling within the scope of the following claims.

What is claimed is:

1. A process for producing polyethylene and/or interpolymers of ethylene and at least one, or more, other monomers interpolymerizable with the ethylene, and/or mixtures of said interpolymers, having reduced melt index ratio (MIR) and reduced weight average molecular weight (Mw) comprising:

a. introducing a first polyethylene and/or interpolymer of ethylene and at least one, or more, other monomers interpolymerizable with the ethylene, and/or mixture of said interpolymers, into an apparatus and melting the first polyethylene and/or interpolymer of ethylene and/or mixture of interpolymers, at a temperature above the melting point of the first polyethylene and/or interpolymer of ethylene, and/or mixture of interpolymers, b. introducing the resultant molten first polyethylene and/or interpolymer of ethylene and/or mixture of interpolymers, into at least two, or more, sequentially located reaction zones that are maintained at a temperature of at least 220° C., c. subjecting the molten first polyethylene and/or interpolymer of ethylene, and/or mixture of interpolymers, in the at least two, or more, reaction zones to sufficient stirring and for a sufficient period of time, such that the melt index ratio (MIR) and the weight average molecular weight (Mw) of the first polyethylene and/or interpolymer of ethylene and/or mixture of interpolymers, are reduced, and d. recovering a resultant second polyethylene and/or interpolymer of ethylene and/or mixture of interpolymers, having a reduced melt index ratio (MIR) and a reduced weight average molecular weight (Mw) as compared to the first polyethylene and/or interpolymer of ethylene, and/or mixture of interpolymers.

2. The process according to claim 1 wherein the first polyethylene and/or interpolymer of ethylene and/or mixture of interpolymers, is melted at a temperature of at least 200° C.

3. The process according to claim 1 wherein the at least two, or more, reaction zones are each maintained at a temperature of from about 280 to about 600° C.

4. The process according to claim 1 wherein the molten first polyethylene and/or interpolymer of ethylene, and/or mixture of interpolymers, is stirred at a rate of from at least about 100 revolutions per minute (rpm) in each of the two, or more zones.

5. The process according to claim 4 wherein the molten first polyethylene and/or interpolymer of ethylene and/or mixture of interpolymers, is stirred at a rate of from about 100 to about 1,500 revolutions per minute (rpm).

6. The process according to claim 5 wherein the rate of stirring is from about 300 to about 500 revolutions per minute (rpm).

7. The process according to claim 1 wherein the first polyethylene and/or interpolymer of ethylene and/or mixture of interpolymers, is stirred for a period of time of at least about 5 seconds in each of the two, or more, zones.

8. The process according to claim 7 wherein the period of time is from about 5 to about 300 seconds.

9. The process according to claim 8 wherein the period of time is from about 30 to about 120 seconds.

10. The process according to claim 1 further comprising venting the apparatus after the second polyethylene and/or interpolymer of ethylene, and/or mixture of interpolymers, is formed and prior to recovering the second polyethylene and/or interpolymer of ethylene, and/or mixture of interpolymers.

11. The process according to claim 10 wherein the venting is vacuum venting.

12. The process according to claim 1 wherein the apparatus is a screw extruder.

13. The process according to claim 12 wherein the screw extruder is a twin-screw extruder.

14. The process according to claim 5 wherein the apparatus is a twin-screw extruder.

15. The process according to claim 10 wherein the apparatus is a twin-screw extruder.

16. The process according to claim 11 wherein the apparatus is a twin-screw extruder.

17. The process according to claim 1 wherein the monomer interpolymerizable with the ethylene is selected from the group consisting of olefins having from 3 to 16 carbon atoms, alkyl acrylates where the alkyl group has from about 1 to about 15 carbon atoms, alkyl methacrylates where the alkyl group has from about 1 to about 15 carbon atoms ethylenically unsaturated dicarboxylic acids or anhydrides thereof, and vinyl carboxylates where the carboxylate has from about 1 to about 15 carbon atoms.

18. The process according to claim 17 wherein the monomer interpolymerizable with the ethylene is selected from the group consisting of methyl acrylate and butyl acrylate.

19. A process for producing functionalized polyethylene and/or functionalized interpolymers of ethylene and at least one, or more other monomers interpolymerizable with the ethylene, and/or mixtures of said functionalized interpolymers, having reduced melt index ratio (MIR) and reduced weight average molecular weight (Mw) comprising:

a. introducing a polyethylene and/or interpolymer of ethylene and at least one, or more, other monomers interpolymerizable with the ethylene, and/or mixture of said interpolymers, into an apparatus and melting the polyethylene and/or interpolymer of ethylene and/or mixture of interpolymers, at a temperature above the melting point of the polyethylene and/or interpolymer of ethylene, and/or mixture of interpolymers, b. introducing the resultant molten polyethylene and/or interpolymer of ethylene and/or mixture of interpolymers, into at least two, or more, sequentially located reaction zones that are maintained at a temperature of at least 220° C., c. introducing a functionalizing agent into at least one, or more, of the reaction zones, d. subjecting the molten polyethylene and/or interpolymer of ethylene, and/or mixture of interpolymers, and functionalizing agent, in the at least two, or more, reaction zones to sufficient stirring and for a sufficient period of time, such that the melt index ratio (MIR) and the weight average molecular weight (Mw) of the resultant functionalized polyethylene and/or funcationalized interpolymer of ethylene and/or functionalized mixture of interpolymers are reduced, and e. recovering the resultant functionalized polyethylene and/or functionalized interpolymer of ethylene and/or functionalized mixture of interpolymers having a reduced melt index ratio (MIR) and a reduced weight average molecular weight (Mw) as compared to the polyethylene and/or interpolymer of ethylene, and/or mixture of interpolymers.

20. The process according to claim 16 wherein the first polyethylene and/or interpolymer of ethylene and/or mixture of interpolymers, is stirred for a period of time of at least about 5 seconds in each of the two, or more, zones.

21. The process according to claim 19 wherein the functionalizing agent is introduced in an amount of from about 0.20 to about 10 weight percent, based on the weight of the ethylene component.

* * * * *